US009274943B2

(12) United States Patent
Yeh et al.

(10) Patent No.: US 9,274,943 B2
(45) Date of Patent: Mar. 1, 2016

(54) STORAGE UNIT MANAGEMENT METHOD, MEMORY CONTROLLER AND MEMORY STORAGE DEVICE USING THE SAME

(75) Inventors: Chih-Kang Yeh, Kinmen County (TW); Yi-Keng Chen, Pingtung County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 297 days.

(21) Appl. No.: 13/562,284

(22) Filed: Jul. 30, 2012

(65) Prior Publication Data
US 2013/0304965 A1 Nov. 14, 2013

(30) Foreign Application Priority Data

May 8, 2012 (TW) ............... 101116380 A

(51) Int. Cl.
G06F 12/00 (2006.01)
G06F 12/02 (2006.01)
G06F 3/06 (2006.01)
(52) U.S. Cl.
CPC .......... G06F 12/0246 (2013.01); G06F 3/0616 (2013.01); G06F 3/0649 (2013.01); G06F 3/0688 (2013.01); G06F 2212/7211 (2013.01)
(58) Field of Classification Search
CPC .................. G06F 12/0246; G06F 2212/7211; G06F 3/0679; G06F 3/0688; G06F 3/0616; G06F 3/064; G06F 3/0646; G06F 3/0649
See application file for complete search history.

(56) References Cited

U.S. PATENT DOCUMENTS

| 6,081,447 | A | * | 6/2000 | Lofgren et al. ........... 365/185.02 |
| 6,345,001 | B1 | * | 2/2002 | Mokhlesi ................ 365/185.33 |
| 7,945,728 | B1 | * | 5/2011 | Sutardja ............... G06F 12/0246 |
| | | | | 711/112 |
| 8,612,804 | B1 | * | 12/2013 | Kang et al. ...................... 714/42 |
| 2006/0106972 | A1 | * | 5/2006 | Gorobets et al. ............... 711/103 |
| 2006/0161728 | A1 | * | 7/2006 | Bennett et al. ................. 711/103 |
| 2009/0089485 | A1 | * | 4/2009 | Yeh ................................. 711/103 |
| 2009/0157952 | A1 | * | 6/2009 | Kim et al. ...................... 711/103 |
| 2009/0182936 | A1 | * | 7/2009 | Lee ..................... G06F 12/0246 |
| | | | | 711/103 |
| 2010/0023675 | A1 | * | 1/2010 | Chen et al. ..................... 711/103 |
| 2010/0023800 | A1 | * | 1/2010 | Harari et al. ................... 711/103 |
| 2011/0197014 | A1 | * | 8/2011 | Yeh ................................. 711/103 |
| 2011/0238892 | A1 | * | 9/2011 | Tsai et al. ...................... 711/103 |

FOREIGN PATENT DOCUMENTS

| CN | 101137970 | 3/2008 |
| CN | 102201259 | 9/2011 |
| TW | 200849261 | 12/2008 |
| TW | 200915324 | 4/2009 |
| TW | 201003391 | 1/2010 |
| TW | 201005745 | 2/2010 |
| TW | 201128648 | 8/2011 |

\* cited by examiner

*Primary Examiner* — Michael Krofcheck
(74) *Attorney, Agent, or Firm* — Jianq Chyun IP Office

(57) ABSTRACT

A storage unit management method for managing a plurality of physical units in a rewritable non-volatile memory module is provided, wherein the physical units are at least grouped into a data area and a spare area. The method includes configuring a plurality of logical units for mapping to the physical units belonging to the data area, and determining whether the rewritable non-volatile memory module contains cold data. The method further includes performing a first wear-leveling procedure on the physical units if it is determined that the rewritable non-volatile memory module does not contain any cold data, and performing a second wear-leveling procedure on the physical units if it is determined that the rewritable non-volatile memory module contains the cold data.

18 Claims, 8 Drawing Sheets

STORAGE UNIT MANAGEMENT METHOD, MEMORY CONTROLLER AND MEMORY STORAGE DEVICE USING THE SAME

CROSS-REFERENCE TO RELATED APPLICATION

This application claims the priority benefit of Taiwan application serial no. 101116380, filed on May 8, 2012. The entirety of the above-mentioned patent application is hereby incorporated by reference herein and made a part of this specification.

BACKGROUND

1. Technical Field

The invention relates to a storage unit management method of a memory storage device. Particularly, the invention relates to a method for recognizing cold data for managing storage units, and a memory controller and a memory storage device using the same.

2. Related Art

A rewritable non-volatile memory has characteristics of data non-volatile, power-saving, small size and non-mechanical structure, etc., so that it is widely used in various electronic devices. Generally, the rewritable non-volatile memory has a plurality of memory blocks, and each of the memory blocks includes a plurality of pages. Memory block is the smallest unit for erasing data, and page is the smallest unit for writing data. Although the rewritable non-volatile memory has the aforementioned advantages, erase count of each of the memory blocks is limited. For example, the memory block is worn after being erased for ten thousand times, when a part of storage capacity losses or device performance is obviously degraded due to wearing of the memory blocks, it may cause loss of data stored by the user or failure in data storage.

Wearing of the memory blocks is determined by programming or erase count of each of the memory blocks. Namely, if one memory block is only programmed (or written) for once, and is not programmed again thereafter, wearing of such memory block is relatively low. Comparatively, if one memory block is repeatedly programmed and erased, wearing of such memory block is relatively high. For example, when a host that accesses the memory blocks repeatedly uses a same logical block address to write data, the memory block of the same physical address in the rewritable non-volatile memory is repeatedly written and erased.

When some memory blocks are worn and some other memory blocks are not worn, existence of the worn memory blocks may degrade performance of the rewritable non-volatile memory. Besides degradation of the worn memory block itself, the whole performance of the rewritable non-volatile memory is also degraded. Namely, when the number of the worn memory blocks of the rewritable non-volatile memory exceeds a threshold, even if there are still other unworn memory blocks, the rewritable non-volatile memory is still judged to be useless. When the unworn memory blocks are regarded as useless, it is actually a waste of resources.

In order to increase a service life of the rewritable non-volatile memory, the memory blocks therein are averagely used as far as possible. Generally, the memory blocks of the rewritable non-volatile memory are grouped into a data area and a spare area, and a conventional wear-leveling method is to exchange the memory blocks in the data area with the memory blocks in the spare area after the rewritable non-volatile memory operates for a fixed period of time, so that the memory block with less erase count in the data area is exchanged to the spare area for programming (or writing).

When the memory block with less erase count in the data area is exchanged to the spare area, the memory block with higher erase count in the spare area is generally exchanged to the data area. However, if data stored in such memory block is frequently updated data, such memory block is probably again associated to the spare area during data updating. However, when wear-leveling is executed for the next time, since the memory block again associated to the spare area has the erase count higher than other memory blocks, it has a higher chance to be exchanged to the data area compared to other memory blocks.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a memory storage device, and a memory controller thereof and a storage unit management method, which avoids unleveling of erase count of physical units, so as to prolong a service life of the memory storage device.

The invention provides a storage unit management method for managing a plurality of physical units in a rewritable non-volatile memory module. The method includes configuring a plurality of logical units for mapping to a part of the physical units, and determining whether the rewritable non-volatile memory module contains cold data. The method further includes performing a first wear-leveling procedure on the physical units when it is determined that the rewritable non-volatile memory module does not contain any cold data, and performing a second wear-leveling procedure on the physical units when it is determined that the rewritable non-volatile memory module contains the cold data.

According to another aspect, the invention provides a memory controller, which is adapted to a memory storage device having a rewritable non-volatile memory module. The memory controller includes a host system interface, a memory interface and a memory management circuit. The host system interface is coupled to a host system. The memory interface is coupled to the rewritable non-volatile memory module, wherein the rewritable non-volatile memory module includes a plurality of physical units. The memory management circuit is coupled to the host system interface and the memory interface for configuring a plurality of logical units for mapping to a part of the physical units. The memory management circuit determines whether the rewritable non-volatile memory module contains cold data. When it is determined that the rewritable non-volatile memory module does not contain any cold data, the memory management circuit performs a first wear-leveling procedure on the physical units. When it is determined that the rewritable non-volatile memory module contains the cold data, the memory management circuit performs a second wear-leveling procedure on the physical units.

According to another aspect, the invention provides a memory storage device including a rewritable non-volatile memory module, a connector and a memory controller. The rewritable non-volatile memory module includes a plurality of physical units. The connector is coupled to a host system. The memory controller is coupled to the rewritable non-volatile memory module and the connector for configuring a plurality of logical units for mapping to a part of the physical units. The memory controller determines whether the rewritable non-volatile memory module contains cold data. When it is determined that the rewritable non-volatile memory module does not contain any cold data, the memory controller performs a first wear-leveling procedure on the physical units. When it is determined that the rewritable non-volatile memory module contains the cold data, the memory controller performs a second wear-leveling procedure on the physical units.

According to the above descriptions, it is determined whether the rewritable non-volatile memory module contains the cold data, and a corresponding manner is used to manage the physical units according to the determination result. For example, different wear-leveling procedures are performed on the physical units according to whether the rewritable non-volatile memory module contains the cold data. In this way, the erase count of the physical units can be effectively levelled, so as to prolong the service life of the memory storage device.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
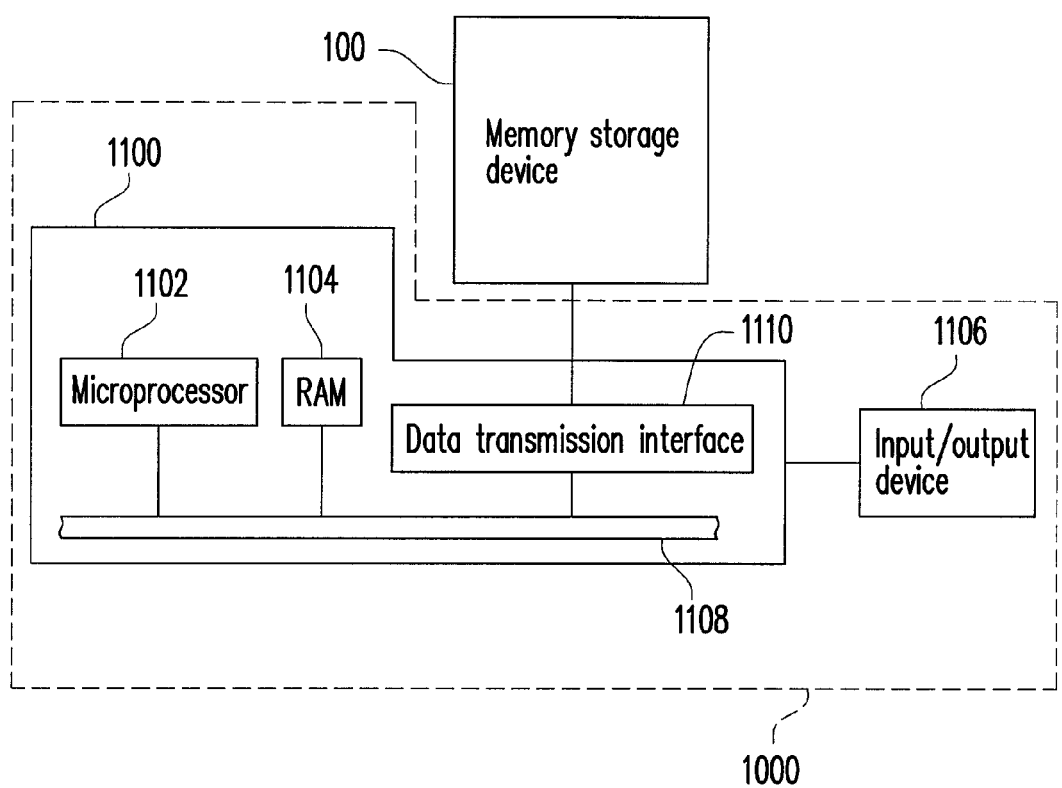
FIG. 1A is a schematic diagram of a host system using a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, the memory storage device (i.e. the memory storage system) includes a rewritable non-volatile memory module and a controller (which is also referred to as a control circuit). The memory storage device is generally used together with a host system, and the host system can write data into the memory storage device or read data from the memory storage device.

FIG. 1A is a schematic diagram of a host system using a memory storage device according to an exemplary embodiment of the invention.

Figure 1B:
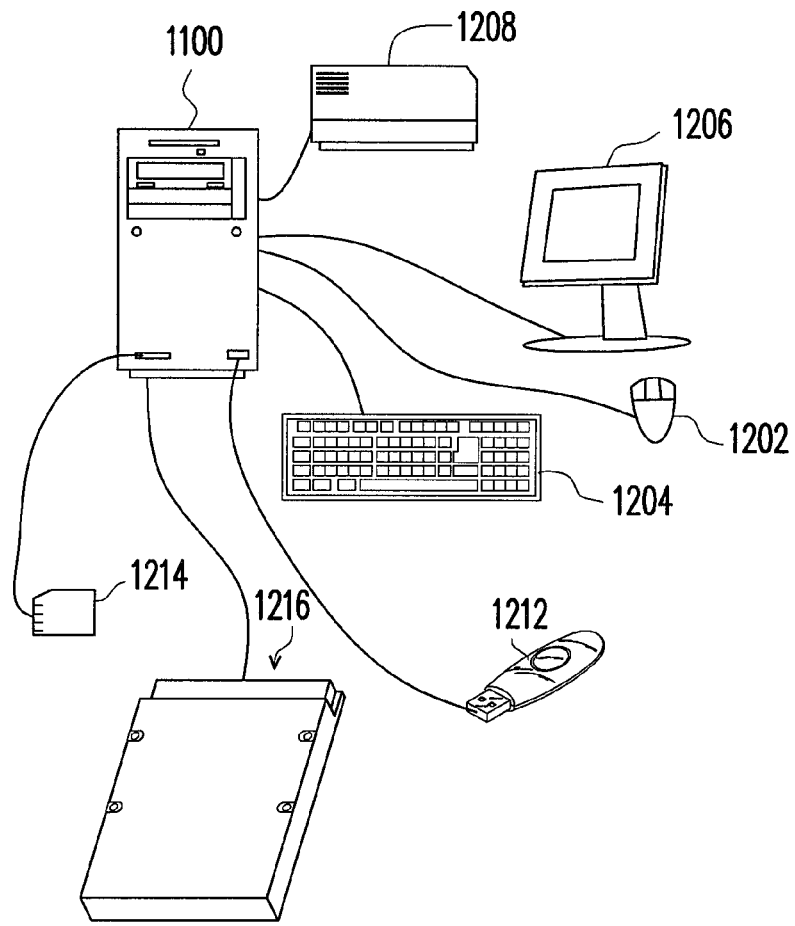
FIG. 1B is a schematic diagram of a computer, input/output devices and a memory storage device according to an exemplary embodiment of the invention.

The host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit the I/O device 1106, and the I/O device 1106 may further include other devices.

In the present exemplary embodiment, the memory storage device 100 is coupled to the other components of the host system 1000 through the data transmission interface 1110. Based on operations of the microprocessor 1102, the RAM 1104 and the I/O device 1106, the host system 1000 can write data into the memory storage device 100 or read data from the memory storage device 100. For example, the memory storage device 100 can be a memory card 1214, a flash drive 1212 or a solid state drive (SSD) 1216 of FIG. 1B.

Figure 1C:
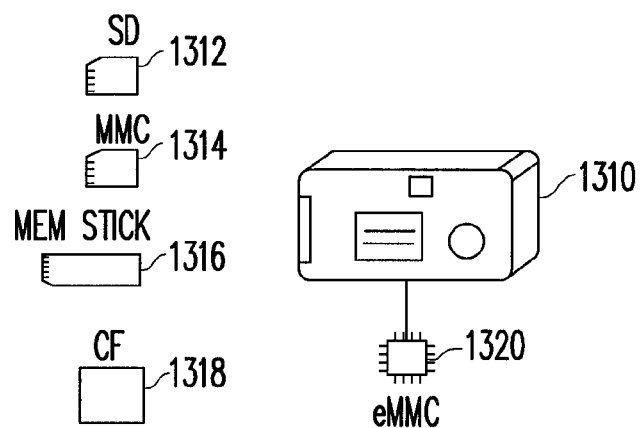
FIG. 1C is a schematic diagram of a host system and a memory storage device according to another exemplary embodiment of the invention.

Generally, the host system 1000 can be any system capable of storing data. In the present exemplary embodiment, although the host system 1000 is implemented by a computer system, in another exemplary embodiment of the invention, the host system 1000 can also be a mobile phone, a digital camera, a video camera, a communication device, an audio player or a video player, etc. For example, when the host system is a digital camera 1310, the memory storage device is a secure digital (SD) card 1312, a multimedia card (MMC) card 1314, a memory stick (MS) 1316, a compact flash (CF) card 1318 or an embedded storage device 1320 (shown in FIG. 1C). The embedded storage device 1320 includes an embedded MMC (eMMC). It should be noticed that the eMMC is directly coupled to a substrate of the host system.

Figure 2:
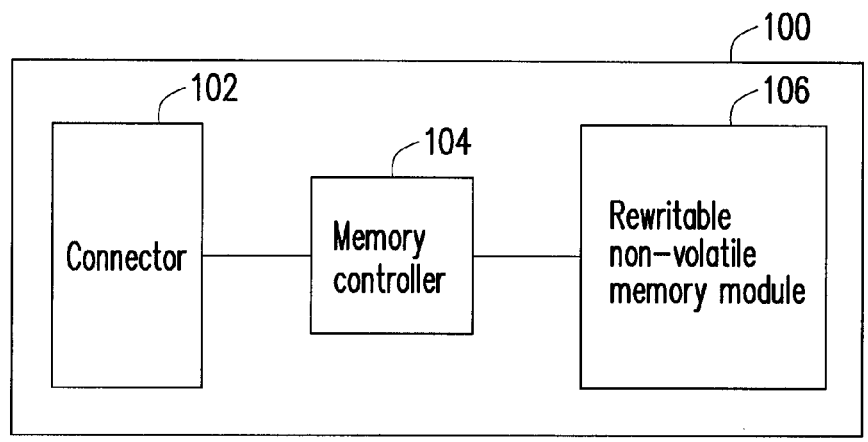
FIG. 2 is a schematic block diagram of the memory storage device of FIG. 1A.

FIG. 2 is a schematic block diagram of the memory storage device 100 of FIG. 1A. Referring to FIG. 2, the memory storage device 100 includes a connector 102, a memory controller 104 and a rewritable non-volatile memory module 106.

The connector 102 is coupled to the memory controller 104 and is coupled to the host system 1000. In the present embodiment, a transmission interface supported by the connector 102 is a serial advanced technology attachment (SATA) interface. However, in other exemplary embodiments, the transmission interface of the connector 102 can also be a universal serial bus (USB) interface, an MMC interface, a parallel advanced technology attachment (PATA) interface, an institute of electrical and electronic engineers (IEEE) 1394 interface, a peripheral component interconnect express (PCI express) interface, a secure digital (SD) interface, an MS interface, a CF interface, an integrated drive electronics (IDE) interface or other suitable interfaces, which is not limited by the invention.

The memory controller 104 may execute a plurality of logic gates or control instructions implemented by a hardware form or a firmware form, and may perform a program operation, a read operation or an erase operation on the rewritable non-volatile memory module 106 according to an instruction of the host system 1000. The memory controller 104 further adopts a corresponding rule in management according to a storage unit management method of the invention. For example, the memory controller 104 executes different wear-leveling procedures when the rewritable non-volatile memory module 106 has cold data or does not have cold data. The storage unit management method of the present embodiment is described later with reference of figures.

The rewritable non-volatile memory module 106 is coupled to the memory controller 104. The rewritable non-volatile memory module 106 includes a plurality of physical units. In an exemplary embodiment, each of the physical units is composed of a physical block (one physical block includes a plurality of physical pages), though the invention is not limited thereto. In other exemplary embodiments, each of the physical units can also be composed of a plurality of physical blocks, and composition of the physical unit is not limited by the invention. For example, the rewritable non-volatile memory module 106 is a multi level cell (MLC) NAND flash memory module, though the invention is not limited thereto, and the rewritable non-volatile memory module 106 can also be a single level cell (SLC) NAND flash memory module, other flash memory modules or any memory module having the same characteristic.

Figure 3:
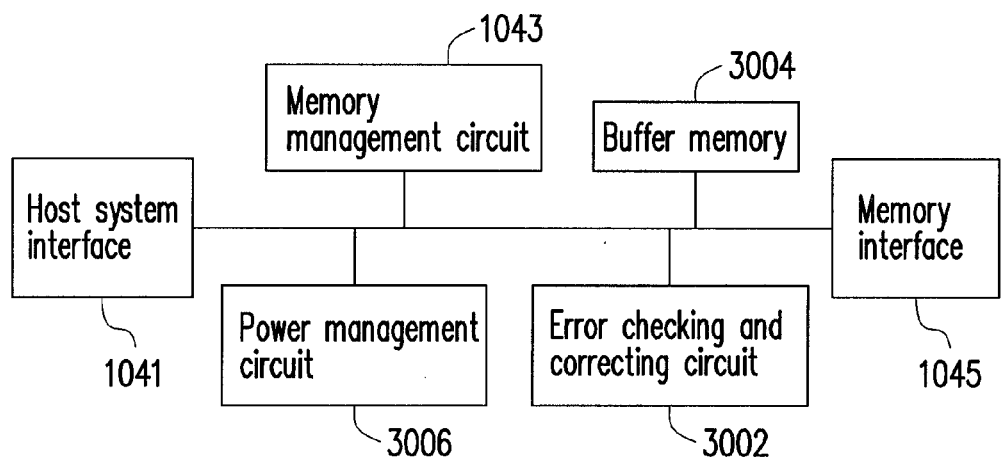
FIG. 3 is a schematic block diagram of a memory controller according to an exemplary embodiment of the present invention.

FIG. 3 is a schematic block diagram of a memory controller according to an exemplary embodiment of the present invention. Referring to FIG. 3, the memory controller 104 includes a host system interface 1041, a memory management circuit 1043 and a memory interface 1045.

The host system interface 1041 is coupled to the memory management circuit 1043, and is coupled to the host system 1000 through the connector 102. The host system interface 1041 is configured to receive and recognize commands and data transmitted by the host system 1000. In this way, the commands and data transmitted by the host system 1000 are transmitted to the memory management circuit 1043 through the host system interface 1041. In the present exemplary embodiment, the host system interface 1041 is a SATA interface corresponding to the connector 102, and in other exemplary embodiments, the host system interface 1041 can also be a USB interface, an MMC interface, a PATA interface, an IEEE 1394 interface, a PCI express interface, an SD interface, an MS interface, a CF interface, an IDE interface or interfaces complied with other interface standards.

The memory management circuit 1043 is configured to control a whole operation of the memory controller 104. In detail, the memory management circuit 1043 has a plurality of control instructions, and when the memory storage device 100 is power-on, these control instructions are executed to implement the storage unit management method of the present exemplary embodiment.

In an exemplary embodiment, the control instructions of the memory management circuit 1043 are implemented in a firmware form. For example, the memory management circuit 1043 has a micro processing unit (not shown) and a read-only memory (not shown), and these control instructions are burned in the read-only memory. When the memory storage device 100 operates, these control instructions are executed by the micro processing unit to implement the storage unit management method of the present exemplary embodiment.

In another exemplary embodiment, the control instructions of the memory management circuit 1043 may also be stored in a specific area (for example, a system area used for storing system data in the rewritable non-volatile memory module 106) of the rewritable non-volatile memory module 106 as program codes. Moreover, the memory management circuit 1043 has a micro processing unit (not shown), a read-only memory (not shown) and a random access memory (RAM) (not shown). Particularly, the read-only memory has boot codes, and when the memory controller 104 is enabled, the micro processing unit first runs the boot codes to load the control instructions stored in the rewritable non-volatile memory module 106 to the RAM of the memory management circuit 1043. Then, the micro processing unit executes these control instructions to implement the storage unit management method of the present exemplary embodiment.

Moreover, in another exemplary embodiment of the present invention, the control instructions of the memory management circuit 1043 may also be implemented in a hardware form. For example, the memory management circuit 1043 includes a micro controller, a memory management unit, a memory writing unit, a memory reading unit, a memory erasing unit and a data processing unit. The memory management unit, the memory writing unit, the memory reading unit, the memory erasing unit and the data processing unit are coupled to the micro controller. The memory management unit is used for managing the physical blocks of the rewritable non-volatile memory module 106. The memory writing unit is used for sending a write command to the rewritable non-volatile memory module 106 to write data into the rewritable non-volatile memory module 106. The memory reading unit is used for sending a read command to the rewritable non-volatile memory module 106 to read data from the rewritable non-volatile memory module 106. The memory erasing unit is used for sending an erase command to the rewritable non-volatile memory module 106 to erase data in the rewritable non-volatile memory module 106. The data processing unit is used for processing data to be written into the rewritable non-volatile memory module 106 and data read from the rewritable non-volatile memory module 106.

The memory interface 1045 is coupled to the memory management circuit 1043 and is configured to couple the memory controller 104 and the rewritable non-volatile memory module 106. In this way, the memory controller 104 can perform related operations on the rewritable non-volatile memory module 106. Namely, data to be written into the rewritable non-volatile memory module 106 is converted into a format that can be accepted by the rewritable non-volatile memory module 106 through the memory interface 1045.

In another exemplary embodiment of the invention, the memory controller 104 further includes an error checking and correcting (ECC) circuit 3002. The ECC circuit 3002 is coupled to the memory management circuit 1043 and is configured to perform an error checking and correcting procedure to ensure correctness of data. In detail, when the memory management circuit 1043 receives a write command from the host system 1000, the ECC circuit 3002 generates a corresponding error checking and correcting code (ECC code) for data corresponding to the write command, and the memory management circuit 1043 writes the data corresponding to the write command and the corresponding ECC code to the rewritable non-volatile memory module 106. Then, when the memory management circuit 1043 reads data from the rewritable non-volatile memory module 106, it simultaneously reads the ECC code corresponding to the data, and the ECC circuit 3002 performs the error checking and correcting procedure on the read data according to the ECC code to recognize whether the data has an error bit.

In another exemplary embodiment of the invention, the memory controller 104 further includes a buffer memory 3004. The buffer memory 3004 can be a static random access memory (SRAM), or a dynamic random access memory (DRAM), etc., which is not limited by the invention. The buffer memory 3004 is coupled to the memory management circuit 1043, and is configured to temporarily store data and commands from the host system 1000 or data from the rewritable non-volatile memory module 106.

In another exemplary embodiment of the invention, the memory controller 104 further includes a power management circuit 3006. The power management circuit 3006 is coupled to the memory management circuit 1043 and is configured to control the power of the memory storage device 100.

Figure 4:
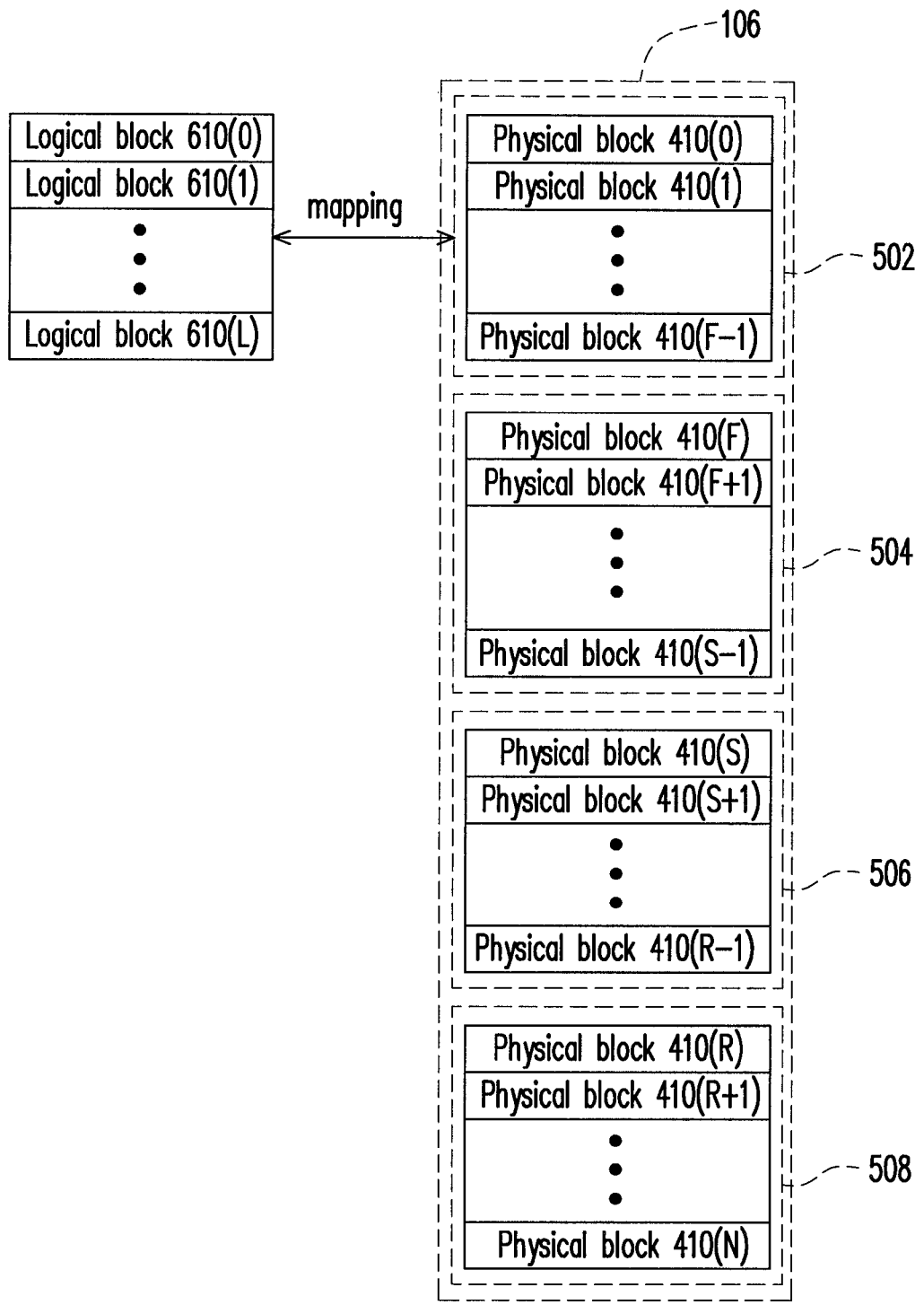
FIG. 4 is a schematic diagram illustrating an example of managing physical blocks according to an exemplary embodiment of the present invention.

For simplicity's sake, in the following exemplary embodiment, it is assumed that each of the physical units is composed of a physical block. FIG. 4 is a schematic diagram illustrating an example of managing physical blocks of the rewritable non-volatile memory module according to an exemplary embodiment of the present invention. It should be noticed that although the physical block is taken as a management unit, the invention is not limited thereto.

Moreover, it should be noticed that the terms used for describing operations of the rewritable non-volatile memory module 106 such as "select", "exchange", "group" and "alternate", etc. for operating the physical blocks are only logical concepts. Namely, actual positions of the physical blocks of the rewritable non-volatile memory module 106 are not changed, and the physical blocks of the rewritable non-volatile memory module 106 are only operated logically.

Referring to FIG. 4, the rewritable non-volatile memory module 106 of the present exemplary embodiment includes physical blocks 410(0)-410(N). The memory management circuit 1043 in the memory controller 104 logically groups the physical blocks 410(0)-410(N) into a data area 502, a spare area 504, a system area 506 and a replacement area 508. F, S, R and N indicated in FIG. 4 are positive integers, and respectively represent the number of the physical blocks configured to each of the areas, which can be determined by the manufacturer according to capacity of the rewritable non-volatile memory module 106.

The physical blocks logically belonging to the data area 502 and the spare area 504 are used to store data from the host system 1000. In detail, the physical blocks grouped to the data area 502 are regarded as empty physical blocks before storing any data. When the host system 1000 sends a write command to write data into the rewritable non-volatile memory module 106, the memory management circuit 1043 selects an empty physical block from the data area 502 for writing data. However, when the host system 1000 sends the write command and the data area 502 has no empty physical block, the memory management circuit 1043 selects a physical block from the spare area 504, and writes data into the selected physical block to substitute the physical block in the data area 502. Alternatively, when a data merging procedure is performed on a logical block, the memory management circuit 1043 selects a physical block from the spare area 504 for writing data therein, so as to substitute the physical block originally mapped to the logical block.

The physical blocks logically belonging to the system area 506 are used for recording system data. For example, the system data includes a manufacturer and a model number related to the rewritable non-volatile memory module 106, the number of the physical blocks of the rewritable non-volatile memory module 106, and the number of physical pages in each physical block, etc.

The physical blocks logically belonging to the replacement area 508 are used for replacing damaged physical blocks when the physical blocks in the data area 502, the spare area 504 or the system area 506 are damaged. In detail, during an operation period of the memory storage device 100, when the replacement area 508 still has normal physical blocks and some physical blocks in the data area 502 are damaged, the memory management circuit 1043 selects the normal physical blocks from the replacement area 508 to replace the damaged physical blocks in the data area 502. Therefore, during the operation period of the memory storage device 100, the physical blocks in the data area 502, the spare area 504, the system area 506 and the replacement area 508 are dynamically varied. For example, the physical blocks alternately storing data are variably belonged to the data area 502 or the spare area 504.

To facilitate the host system 1000 accessing the rewritable non-volatile memory module 106, the memory management circuit 1043 configures a plurality of logical blocks 610(0)-610(L) for mapping to the physical blocks 410(0)-410(F−1) in the data area 502, where each logical block has a plurality of logical pages, and the logical pages in the logical blocks 610(0)-610(L) are mapped to the physical pages of the physical blocks 410(0)-410(F−1).

In detail, the memory management circuit 1043 provides the configured logical blocks 610(0)-610(L) to the host system 1000, and maintains a logical block-physical block mapping table to record a mapping relationship between the logical blocks 610(0)-610(L) and the physical blocks 410(0)-410(F−1). Therefore, when the host system 1000 is about to access a certain logical access address, the memory management circuit 1043 converts the logical access address into logical pages of the corresponding logical block, and accesses data of the corresponding physical pages according to the logical block-physical block mapping table.

Based on characteristics of the rewritable non-volatile memory module 106, the physical block written with data has to be erased first for writing data again. Since the physical block is the smallest unit for erasing data, the memory management circuit 1043 records an erase count of each of the physical blocks. For example, the physical block and the erase count thereof can be recorded in a corresponding table and stored in the buffer memory 3004. The memory management circuit 1043 can accordingly count memory erase count (i.e. a sum of the erase count of the physical blocks 410(0)-410(N)) of the rewritable non-volatile memory module 106 so far.

During the operation period of the memory storage device 100, each time when a physical block is erased, the memory management circuit 1043 updates the erase count of such physical block. For example, when the host system 1000 updates data stored in the physical block 410(0) of the data area 502, the memory management circuit 1043 selects a physical block (for example, the physical block 410(F)) from the spare area 504 to write new data to be updated and old valid data that is unnecessary to be updated, and erases the physical block 410(0) belonging to the data area 502 and associates it to the spare area 504, and further associates the physical block 410(F) to the data area 502. Therefore, frequent data update may cause that a part of the physical blocks of the rewritable non-volatile memory module 106 is frequently exchanged between the data area 502 and the spare area 504, and the frequently exchanged physical blocks may have higher erase count. Conversely, regarding data that is not varied for a long time after being written into the rewritable non-volatile memory module 106 or is even set to an attribute of "read-only" (such type of data is referred to as cold data hereinafter), the physical block storing such type of data has relatively low erase count due to that the data is rarely updated or cannot be updated.

Generally, the memory management circuit 1043 executes a wear-leveling procedure to level wear degrees of all of the physical blocks in the rewritable non-volatile memory module 106. In detail, the wear-leveling procedure is to respectively select a physical block from the data area 502 and the spare area 504 for exchange. Basically, when the memory management circuit 1043 performs physical block exchange, it selects the physical block with lower erase count from the data area 502 and the physical block with higher erase count from the spare area 504 for exchange, so as to exchange the physical block with lower erase count to the spare area 504 for post writing utilization.

If the rewritable non-volatile memory module 106 contains the cold data, since the physical block used to store the cold data has lower erase count, it is liable to be selected to exchange with the physical block with higher erase count in the spare area 504. Moreover, when the physical block with higher erase count that originally belongs to the spare area 504 is exchanged to the data area 502 to store the cold data, since the cold data has a lower updating chance, a chance of quickly exchanging such physical block back to the spare area 504 due to data updating is relatively low.

Comparatively, if the data stored in the rewritable non-volatile memory module 106 all has a high updating frequency (i.e. the rewritable non-volatile memory module 106 does not contain the cold data), when the memory management circuit 1043 performs the wear-leveling procedure, even if the physical block with lower erase count is selected from the data area 502 to exchange with the physical block with higher erase count in the spare area 504, the physical block exchanged to the data area 502 and having higher erase count is probably exchanged back to the spare area 504 quickly due to that the data stored therein is required to be constantly updated. When the wear-leveling procedure is executed again, such physical block is liable to be again selected and exchanged to the data area 502 due to that it has higher erase count.

For example, it is assumed that the data area 502 of the rewritable non-volatile memory module 106 has 1,000 unused physical blocks, and one of the physical blocks has the erase count higher than that of the other physical blocks. In case that the wear-leveling procedure is executed every a period of time (for example, the rewritable non-volatile memory module 106 executes the wear-leveling procedure each time after one hundred times of erase operations), the number of times that such physical block is constantly exchanged between the data area 502 and the spare area 504 is 10 times greater than that of the other physical blocks, so that a wear degree of such physical block is greatly higher that of the other physical blocks. Therefore, the wear-leveling procedure performed in order to levelly use the physical blocks may cause a result of uneven erase count of the physical blocks.

In order to avoid the above situation, the memory management circuit 1043 determines whether the rewritable non-volatile memory module 106 contains the cold data, and adopts different wear-leveling procedures according to different determination results, so as to level the wear degrees of the physical blocks. A plurality of exemplary embodiments is provided below to describe detailed steps that the memory management circuit 1043 determines whether the rewritable non-volatile memory module 106 contains the cold data, and adopts different wear-leveling procedures according to different determination results.

In an exemplary embodiment, each time when the memory management circuit 1043 executes the wear-leveling procedure to exchange a physical block of the spare area 504 to the data area 502, the memory management circuit 1043 determines whether such physical block is quickly exchanged from the data area 502 back to the spare area 504. If such physical block is quickly exchanged back to the spare area 504, it represents that the data stored in the rewritable non-volatile memory module 106 all has a high updating frequency (i.e. the cold data does not exist), and if such physical block is exchanged back to the spare area 504 after a long time, it is determined that the rewritable non-volatile memory module 106 contains the cold data. In the present exemplary embodiment, the memory management circuit 1043 determines a time length that the physical block is again associated to the spare area 504 from the data area 502 according to the erase count of the rewritable non-volatile memory module 106.

Figure 5:
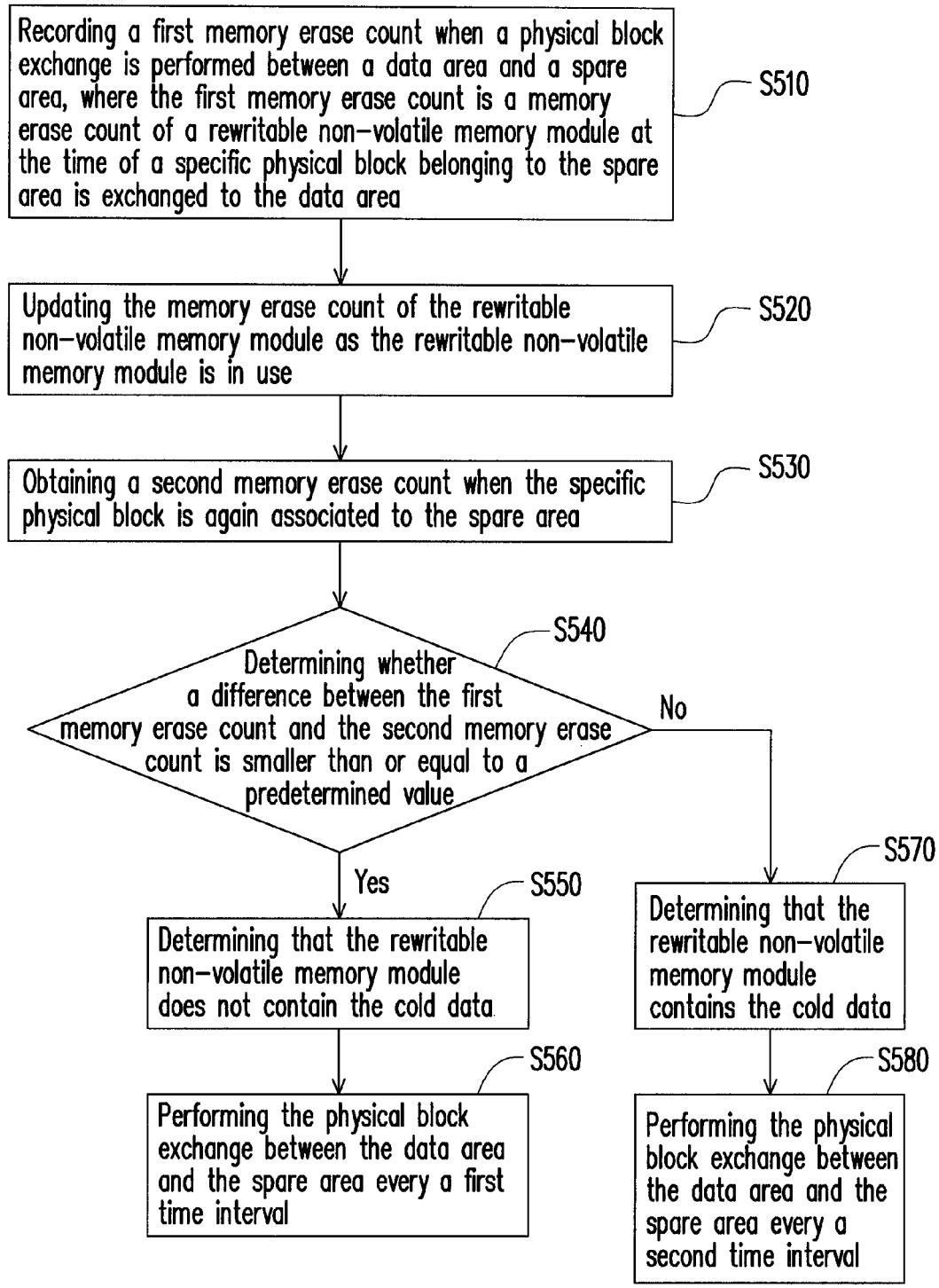
FIG. 5 is a flowchart illustrating a storage unit management method according to an exemplary embodiment of the invention.

FIG. 5 is a flowchart illustrating a storage unit management method according to an exemplary embodiment of the invention. Referring to FIG. 5, first, in step S510, each time when the wear-leveling procedure is performed to execute a physical block exchange between the data area 502 and the spare area 504, the memory management circuit 1043 records a first memory erase count. The first memory erase count is a memory erase count of the rewritable non-volatile memory module 106 at the time of a physical block originally belonging to the spare area 504 (which is referred to as a specific physical block hereinafter) is exchanged to the data area 502.

Then, in step S520, as the rewritable non-volatile memory module 106 is in use, the memory management circuit 1043 continually updates the memory erase count of the rewritable non-volatile memory module 106.

In step S530, once the specific physical block is again associated to the spare area 504, the memory management circuit 1043 obtains the memory erase count of the rewritable non-volatile memory module 106 at that time, and serves the obtained memory erase count as a second memory erase count.

In step S540, a difference between the first memory erase count and the second memory erase count is compared with a predetermined value to determine whether the difference is smaller than or equal to the predetermined value.

If the difference is smaller than or equal to the predetermined value, in step S550, the memory management circuit 1043 determines that the rewritable non-volatile memory module 106 does not contain the cold data. If the difference is greater than the predetermined value, in step S570, the memory management circuit 1043 determines that the rewritable non-volatile memory module 106 contains the cold data.

In the present exemplary embodiment, the predetermined value is, for example, a total number of the physical blocks 410(0)-410(N). For example, it is assumed that the total number of the physical blocks 410(0)-410(N) is 2,000, and it is assumed that when the specific physical block is exchanged to the data area 502, the memory erase count of the rewritable non-volatile memory module 106 is 100, and when the specific physical block is again associated to the spare area 504, the memory erase count of the rewritable non-volatile memory module 106 is 10,000. Namely, after the specific physical block is exchanged to the data area 502, it is again exchanged back to the spare area 504 after 9900 times of erasing operations of the memory storage device 100, and since the difference between the first and second memory erase count is greater than the total number of the physical blocks, the memory management circuit 1043 determines that the specific physical block is exchanged to the data area 502 for storing the cold data in a last wear-leveling procedure, so that it is determined that the rewritable non-volatile memory module 106 contains the cold data.

However, if the memory erase count of the rewritable non-volatile memory module 106 is 1,000 when the specific physical block is again associated to the spare area 504, it represents that the specific physical block is again exchanged back to the spare area 504 after 900 times of erasing operations of the rewritable non-volatile memory module 106, and since the difference between the first and second memory erase count is smaller than or equal to the total number of the physical blocks, the memory management circuit 1043 determines that the specific physical block is exchanged to the data area 502 for storing data to be constantly updated in the last wear-leveling procedure. Therefore, the memory management circuit 1043 determines that the rewritable non-volatile memory module 106 does not contain the cold data.

In case that the rewritable non-volatile memory module 106 does not contain the cold data, in step S560, the memory management circuit 1043 performs the wear-leveling procedure (i.e. performs the physical block exchange between the data area 502 and the spare area 504) every a first time interval. When it is determined that the rewritable non-volatile memory module 106 contains the cold data, in step S580, the memory management circuit 1043 performs the wear-leveling procedure every a second time interval. In the present exemplary embodiment, the first time interval and the second time interval correspond to the memory erase count of the rewritable non-volatile memory module 106, and the first time interval is greater than the second time interval. For example, the first time interval corresponds to 1,000 memory erase count of the rewritable non-volatile memory module 106, and the second time interval corresponds to 100 memory erase count of the rewritable non-volatile memory module 106.

In the exemplary embodiment of FIG. 5, the memory management circuit 1043 dynamically adjusts the time interval for executing the wear-leveling procedure according to a determination result. If the specific physical block is exchanged back to the spare area 504 after a longer time, it is known that the specific physical block is previously exchanged to the data area 502 for storing the cold data, so that the memory management circuit 1043 executes the wear-leveling procedures in a shorter time interval, for example, executes the wear-leveling procedure each time after 100 times of memory erasing operations of the rewritable non-volatile memory module 106. However, if the specific physical block is exchanged back to the spare area 504 within a shorter time, it represents that the specific physical block is previously exchanged to the data area 502 for storing data to be constantly updated, which means that the rewritable non-volatile memory module 106 probably does not contain the cold data. Therefore, the memory management circuit 1043 executes the wear-leveling procedures in a longer time interval, for example, executes the wear-leveling procedure each time after 1,000 times of memory erasing operations of the rewritable non-volatile memory module 106, so as to avoid a situation that the erase count of the physical block originally having higher erase count is greatly increased compared to that of the other physical blocks due to frequent wear-leveling procedures.

Besides adjusting an executing frequency of the wear-leveling procedure according to whether the rewritable non-volatile memory module 106 contains the cold data, in another exemplary embodiment, the memory management module 1043 can also use different methods to select the physical blocks from the data area 502 and the spare area 504 for exchanging according to whether the rewritable non-volatile memory module 106 contains the cold data. For example, in case that the cold data does not exist, when the memory management circuit 1043 performs the physical block exchange between the data area 502 and the spare area 504 every the first time interval, the memory management circuit 1043 randomly selects a physical block from all of the physical blocks belonging to the spare area 504, or selects a physical block with a higher erase count rather than the highest erase count for exchanging with a physical block with the lowest erase count in the data area 502. In case that the cold data exists, when the memory management circuit 1043 performs the physical block exchange between the data area 502 and the spare area 504 every the second time interval, the memory management circuit 1043 selects a physical block with the highest erase count from all of the physical blocks belonging to the spare area 504 for exchanging with the physical block with the lowest erase count in the data area 502.

It should be noticed that in the aforementioned exemplary embodiment, one physical block is exchanged between the data area 502 and the spare area 504 when the wear-leveling procedure is executed, though the exchanging unit is not limited by the invention. In another exemplary embodiment, if each of the physical units is composed of m physical blocks (m is an integer greater than 1), each time when the wear-leveling procedure is executed, the memory management circuit 1043 selects m physical blocks with smaller erase count from the data area 502 for exchanging with m physical blocks with higher erase count in the spare area 504. In another exemplary embodiment, the exchanging unit of the wear-leveling procedure can be any predetermined unit, which is not limited to be complied with a size of the physical unit.

In another exemplary embodiment, the memory management circuit 1043 determines whether the rewritable non-volatile memory module 106 contains the cold data according to a write count of each of the logical blocks 610(0)-610(L). In detail, each time when the host system 1000 is about to write data into a logical access address, the memory management circuit 1043 converts the logical access address into a corresponding logical block, and updates the write count of such logical block. The logical block with write count greater than 0 is referred to as a used logical block hereinafter. The memory management circuit 1043 determines whether the rewritable non-volatile memory module 106 contains the cold data according to a distribution characteristic of the write count of each of the used logical blocks.

Figure 6:
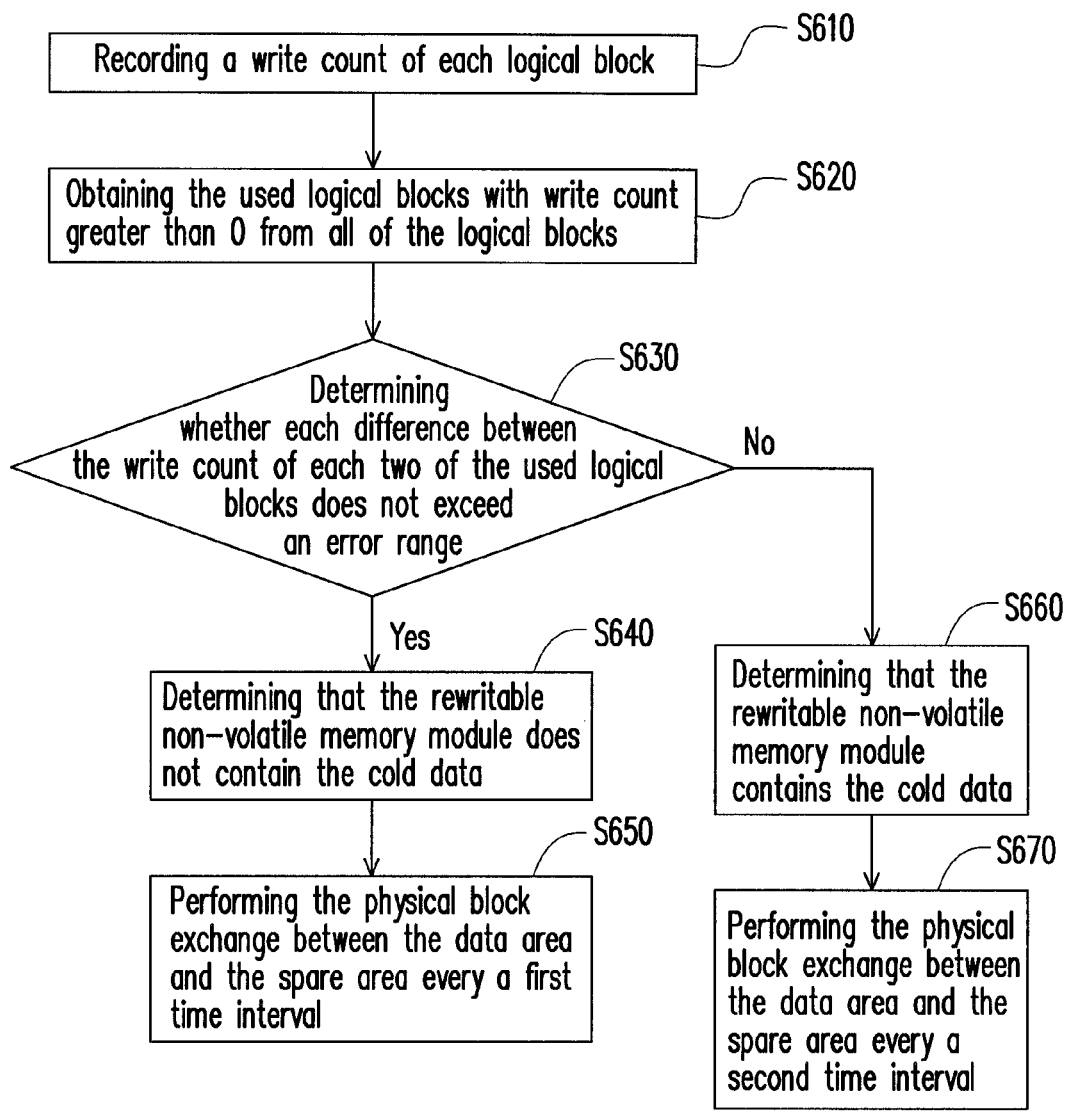
FIG. 6 is a flowchart illustrating a storage unit management method according to another exemplary embodiment of the invention.

FIG. 6 is a flowchart illustrating a storage unit management method according to another exemplary embodiment of the invention. First, in step S610, the memory management circuit 1043 continually records the write count of each of the logical blocks 610(0)-610(L) when the memory storage device 100 is in use.

In step S620, the memory management circuit 1043 obtains a plurality of the used logical blocks with write count greater than 0 from the logical blocks 610(0)-610(L).

Then, in step S630, the memory management circuit 1043 determines whether a difference between the write count of each two of the used logical blocks does not exceed an error range, where the error range is, for example, 25, though the invention is not limited thereto.

If the difference between each two of the write count does not exceed the error range, it represents that the host system 1000 levelly performs the writing operations on the used logical blocks, so that updating frequencies of data stored in the physical blocks corresponding to the used logical blocks are close. Therefore, in step S640, the memory management circuit 1043 determines that the rewritable non-volatile memory module 106 does not contain the cold data. Comparatively, if the determination result of the step S630 is negative, it represents that the write count of at least one used logical block is greatly different to the write count of the other used logical blocks, namely, the data stored in the corresponding physical block is less updated, and in step S660, the memory management circuit 1043 determines that the rewritable non-volatile memory module 106 contains the cold data.

For example, it is assumed that the memory management circuit 1043 obtains three used logical blocks from the logical blocks 610(0)-610(L), which respectively correspond to write count of 100, 80 and 80. Since a difference between each two of the write count is smaller than the error range (for example, 25), the memory management circuit 1043 determines that the rewritable non-volatile memory module 106 does not contain the cold data.

It is assumed that the write count corresponding to the three used logical blocks obtained by the memory management circuit 1043 are respectively 100, 80 and 10, since not all of the differences between each two of the write count are smaller than the error range, the memory management circuit 1043 determines that the rewritable non-volatile memory module 106 contains the cold data.

In the present exemplary embodiment, when the memory management circuit 1043 determines that the rewritable non-volatile memory module 106 does not contain the cold data, in step S650, the memory management circuit 1043 performs the physical block exchange between the data area 502 and the spare area 504 every the first time interval. When the memory management circuit 1043 determines that the rewritable non-volatile memory module 106 contains the cold data, in step S670, the memory management circuit 1043 performs the physical block exchange between the data area 502 and the spare area 504 every the second time interval. Since details steps of performing the physical block exchange between the data area 502 and the spare area 504 every the first or the second time interval are the same or similar as that described in the exemplary embodiment of FIG. 5, details thereof are not repeated. It should be noticed that in the aforementioned embodiment, exchange of one physical block is taken as an example for descriptions, though the exchanging unit of the wear-leveling procedure is not limited by the invention.

Figure 7:
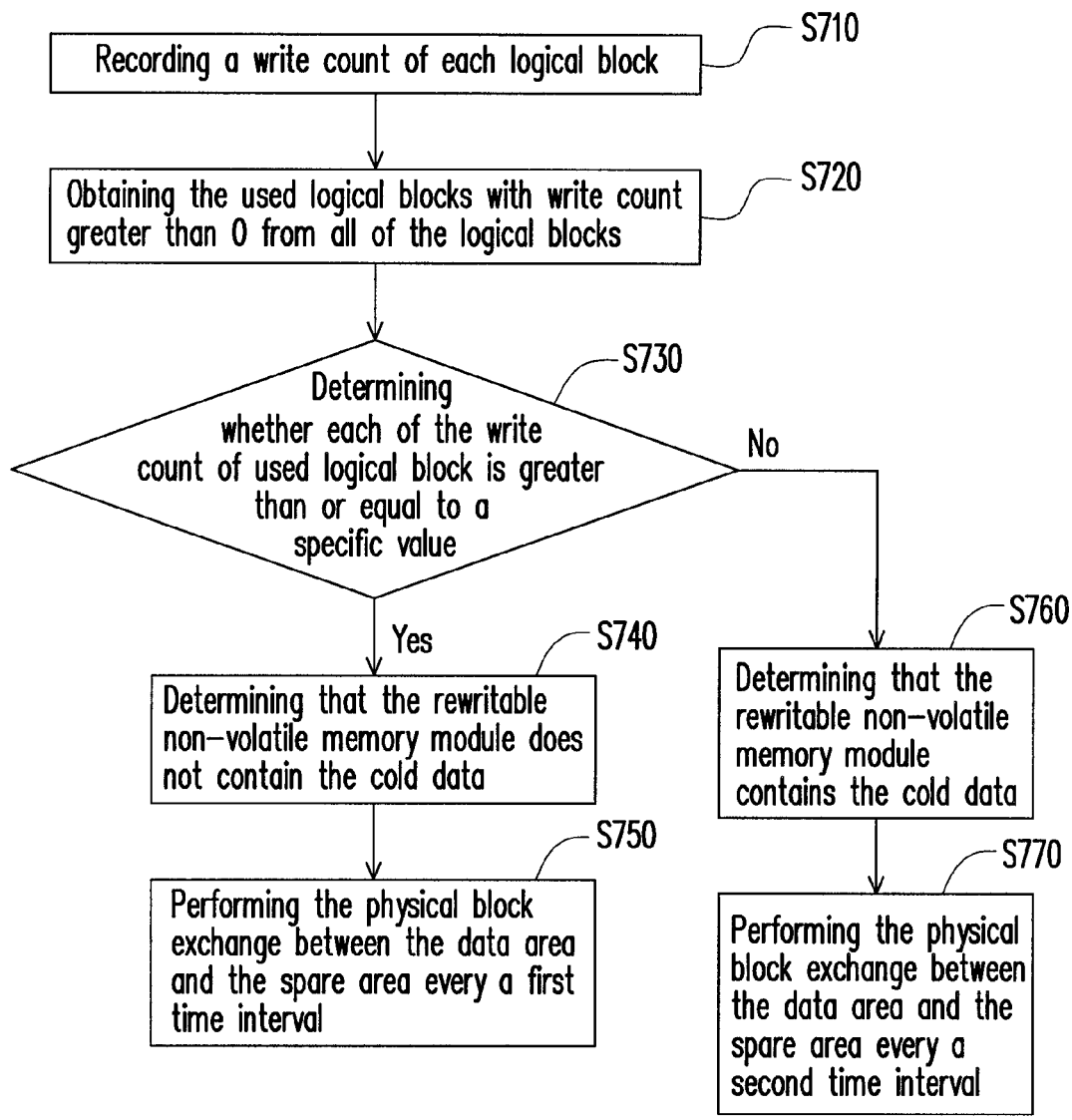
FIG. 7 is a flowchart illustrating a storage unit management method according to still another exemplary embodiment of the invention.

FIG. 7 is a flowchart illustrating a storage unit management method according to still another exemplary embodiment of the invention. A difference between the embodiments of FIG. 7 and FIG. 6 lies in a determination mechanism of a step S730, and since the other steps of FIG. 7 are similar to that of FIG. 6, only the difference there between is described below.

In the step S730, the memory management circuit 1043 determines whether each of the write count of used logical block is greater than or equal to a specific value. In the present exemplary embodiment, the specific value is a fractional value (for example, ½, though the invention is not limited thereto) of a maximum write count among each the write count of logical block. If each of the write count of used logical block is greater than or equal to the specific value, it represents that the data stored in the physical block corresponding to each of the used logical blocks is frequently updated. Therefore, in step S740, the memory management circuit 1043 determines that the rewritable non-volatile memory module 106 does not contain the cold data. However, if at least one of the write count of the used logical blocks is smaller than the specific value, it represents that the updating frequency of the data stored in the corresponding physical block is far less than that of the other data. Therefore, in step S760, the memory management circuit 1043 determines that the rewritable non-volatile memory module 106 contains the cold data.

For example, it is assumed that the memory management circuit 1043 obtains three used logical blocks from the logical blocks 610(0)-610(L), which respectively correspond to write count of 100, 80 and 10, and if the specific value is one half of the maximum write count (i.e. the specific value is 50), since the write count of one of the three used logical blocks is smaller than 50, the memory management circuit 1043 determines that the rewritable non-volatile memory module 106 contains the cold data. In another exemplary embodiment, if the corresponding write count of the three used logical blocks obtained by the memory management circuit 1043 are respectively 100, 80 and 80, since the write counts of all of the used logical blocks are greater than the specific value, the memory management circuit 1043 determines that the rewritable non-volatile memory module 106 does not contain the cold data.

It should be noticed that a basic unit used for counting the write count is the logical block (which is also referred to as a logical unit), though the invention is not limited thereto, and the logical unit can also be a logical sector, a plurality of logical sectors, a logical page, a plurality of logical pages or a plurality of logical blocks, etc.

Figure 8:
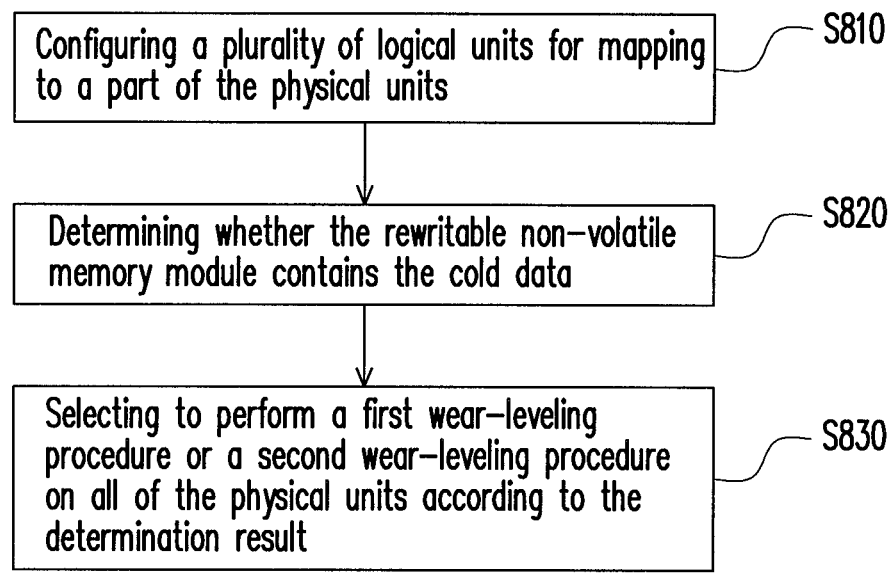
FIG. 8 is a flowchart illustrating a storage unit management method according to yet another exemplary embodiment of the invention.

FIG. 8 is a flowchart illustrating a storage unit management method according to yet another exemplary embodiment of the invention.

Referring to FIG. 8, in step S810, the memory management circuit 1043 configures a plurality of logical units for mapping to a part of the physical units of the rewritable non-volatile memory module 106, wherein each of the physical units can be a physical block or a plurality of physical blocks, and the size of each of the logical unit corresponds to the size of the physical unit.

Then, in step S820, the memory management circuit 1043 determines whether the rewritable non-volatile memory module 106 contains the cold data.

In step S830, the memory management circuit 1043 selects to perform a first wear-leveling procedure or a second wear-leveling procedure on all of the physical units according to the determination result. In a exemplary embodiment, a difference between the first wear-leveling procedure and the second wear-leveling procedure lies in the time interval for executing the physical unit exchange and/or the selection method of the physical units. For example, in case that the cold data does not exist, the physical unit exchanges are executed in a longer time interval, and in case that the cold data exists, the physical unit exchanges are executed in a shorter time interval. However, the invention is not limited to the aforementioned execution method of the wear-leveling procedure. In another exemplary embodiment, the memory management circuit 1043 can also select a corresponding rule to manage the physical units of the rewritable non-volatile memory module 106 according to different determination results. For example, in case of the determination result that the cold data does not exist, the memory management circuit 1043 does not execute the wear-leveling procedure, and only in case that the cold data exists, the memory management circuit 1043 performs the physical unit exchange between the data area 502 and the spare area 504 every the predetermined time interval.

In summary, the memory storage device, the memory controller and the storage unit management method of the invention can not only determine whether the rewritable non-volatile memory module contains the cold data, but can also adopt different methods to manage the physical units according to different determination results, for example, dynamically control the time interval for executing the wear-leveling procedures. In this way, it is avoided to constantly increase the erase count of some physical units to cause unleveling of the erase count, so as to prolong the service life of the memory storage device. However, the advantages aforementioned are not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A storage unit management method, configured to manage a plurality of physical units in a rewritable non-volatile memory module, wherein the physical units are at least grouped into a data area and a spare area, the storage unit management method comprising:
    configuring a plurality of logical units for mapping to a part of the physical units;
    determining whether the rewritable non-volatile memory module contains cold data;
    performing a first wear-leveling procedure on the physical units when it is determined that the rewritable non-volatile memory module does not contain any cold data; and
    performing a second wear-leveling procedure on the physical units when it is determined that the rewritable non-volatile memory module contains the cold data,
    wherein the first wear-leveling procedure is to perform a physical unit exchange between the data area and the spare area every time a first time interval occurs, and the second wear-leveling procedure is to perform the physical unit exchange between the data area and the spare area every time a second time interval occurs,
    wherein when the physical unit exchange is performed between the data area and the spare area every time the second time interval occurs, a physical unit with the highest erase count is selected from all of the physical units belonging to the spare area for exchanging with the physical unit with the lowest erase count in the data area,
    wherein the physical units are at least grouped into a data area and a spare area, and the step of determining whether the rewritable non-volatile memory module contains the cold data comprises:
    recording a first memory erase count when the physical unit exchange is performed between the data area and the spare area, wherein the first memory erase count is a memory erase count of the rewritable non-volatile memory module at the time of a specific physical unit belonging to the spare area is exchanged to the data area;
    updating the memory erase count of the rewritable non-volatile memory module as the rewritable non-volatile memory module is in use;
    obtaining the memory erase count of the rewritable non-volatile memory module at the time of the specific physical unit is again associated to the spare area to serve as a second memory erase count;
    comparing a difference between the first memory erase count and the second memory erase count with a predetermined value;
    determining that the rewritable non-volatile memory module does not contain the cold data when the difference is smaller than or equal to the predetermined value; and
    determining that the rewritable non-volatile memory module contains the cold data when the difference is greater than the predetermined value.

2. The storage unit management method as claimed in claim 1, wherein the predetermined value is a total number of the physical units.

3. The storage unit management method as claimed in claim 1, wherein the step of determining whether the rewritable non-volatile memory module contains the cold data comprises:
    recording a write count of each of the logical units;
    obtaining a plurality of used logical units with the corresponding write count greater than 0 from the logical units; and
    determining whether the rewritable non-volatile memory module contains the cold data according to a distribution characteristic of the write count of each of the used logical units.

4. The storage unit management method as claimed in claim 3, wherein the step of determining whether the rewritable non-volatile memory module contains the cold data according to the distribution characteristic of the write count of each of the used logical units comprises:
    determining that the rewritable non-volatile memory module does not contain the cold data when a difference between the write count of each two of the used logical units does not exceeds an error range; and
    determining that the rewritable non-volatile memory module contains the cold data when at least one of the difference between the write count of each two of the used logical units exceeds the error range.

5. The storage unit management method as claimed in claim 3, wherein the step of determining whether the rewritable non-volatile memory module contains the cold data according to the distribution characteristic of the write count of each of the used logical units comprises:
    determining that the rewritable non-volatile memory module does not contain the cold data when each of the write count of used logical unit is greater than or equal to a specific value; and
    determining that the rewritable non-volatile memory module contains the cold data when at least one of the write count of the used logical units is smaller than the specific value.

6. The storage unit management method as claimed in claim 5, wherein the specific value is a fractional value of a maximum write count among each of the write count of used logical unit.

7. The storage unit management method as claimed in claim 1, wherein the first time interval is greater than the second time interval.

8. The storage unit management method as claimed in claim 7, wherein when the physical unit exchange is performed between the data area and the spare area every time the first time interval occurs, a physical unit is randomly selected or a physical unit with a higher erase count rather than the highest erase count is selected from all of the physical units belonging to the spare area for exchanging with a physical unit with the lowest erase count in the data area.

9. A memory controller, adapted to a memory storage device having a rewritable non-volatile memory module, the memory controller comprising:
a host system interface, coupled to a host system;
a memory interface, coupled to the rewritable non-volatile memory module, wherein the rewritable non-volatile memory module comprises a plurality of physical units; and
a memory management circuit, coupled to the host system interface and the memory interface, and configured to configure a plurality of logical units for mapping to a part of the physical units, wherein the memory management circuit groups the physical units into at least a data area and a spare area,
wherein the memory management circuit determines whether the rewritable non-volatile memory module contains cold data,
when it is determined that the rewritable non-volatile memory module does not contain any cold data, the memory management circuit performs a first wear-leveling procedure on the physical units,
when it is determined that the rewritable non-volatile memory module contains the cold data, the memory management circuit performs a second wear-leveling procedure on the physical units,
wherein the first wear-leveling procedure is to perform a physical unit exchange between the data area and the spare area every time a first time interval occurs, and the second wear-leveling procedure is to perform the physical unit exchange between the data area and the spare area every time a second time interval occurs,
wherein when the memory management circuit performs the physical unit exchange between the data area and the spare area every time the second time interval occurs, the memory management circuit selects a physical unit with the highest erase count from all of the physical units belonging to the spare area for exchanging with the physical unit with the lowest erase count in the data area,
wherein the memory management circuit groups the physical units into at least a data area and a spare area, and records a first memory erase count when the physical unit exchange is performed between the data area and the spare area, wherein the first memory erase count is a memory erase count of the rewritable non-volatile memory module at the time of a specific physical unit belonging to the spare area is exchanged to the data area,
the memory management circuit updates the memory erase count of the rewritable non-volatile memory module as the rewritable non-volatile memory module is in use,
the memory management circuit obtains the memory erase count of the rewritable non-volatile memory module at the time of the specific physical unit is again associated to the spare area to serve as a second memory erase count, and compares a difference between the first memory erase count and the second memory erase count with a predetermined value,
the memory management circuit determines that the rewritable non-volatile memory module does not contain the cold data when the difference is smaller than or equal to the predetermined value, and
the memory management circuit determines that the rewritable non-volatile memory module contains the cold data when the difference is greater than the predetermined value.

10. The memory controller as claimed in claim 9, wherein the memory management circuit records a write count of each of the logical units, obtains a plurality of used logical units with the corresponding write count greater than 0 from the logical units, and determines whether the rewritable non-volatile memory module contains the cold data according to a distribution characteristic of the write count of each of the used logical units.

11. The memory controller as claimed in claim 10, wherein the memory management circuit determines that the rewritable non-volatile memory module does not contain the cold data when a difference between the write count of each two of the used logical units does not exceeds an error range, and
the memory management circuit determines that the rewritable non-volatile memory module contains the cold data when at least one of the difference between the write count of each two of the used logical units exceeds the error range.

12. The memory controller as claimed in claim 9, wherein the first time interval is greater than the second time interval.

13. The memory controller as claimed in claim 12, wherein when the memory management circuit performs the physical unit exchange between the data area and the spare area every time the first time interval occurs, the memory management circuit randomly selects a physical unit or selects a physical unit with a higher erase count rather than the highest erase count from all of the physical units belonging to the spare area for exchanging with a physical unit with the lowest erase count in the data area.

14. A memory storage device, comprising:
a rewritable non-volatile memory module, comprising a plurality of physical units;
a connector, coupled to a host system; and
a memory controller, coupled to the rewritable non-volatile memory module and the connector, and configured to configure a plurality of logical units for mapping to a part of the physical units, wherein the memory controller groups the physical units into at least a data area and a spare area,
wherein the memory controller determines whether the rewritable non-volatile memory module contains cold data,
when it is determined that the rewritable non-volatile memory module does not contain any cold data, the memory controller performs a first wear-leveling procedure on the physical units, and
when it is determined that the rewritable non-volatile memory module contains the cold data, the memory controller performs a second wear-leveling procedure on the physical units,
wherein the first wear-leveling procedure is to perform a physical unit exchange between the data area and the spare area every time a first time interval occurs, and the second wear-leveling procedure is to perform the physical unit exchange between the data area and the spare area every time a second time interval occurs,
wherein when the memory controller performs the physical unit exchange between the data area and the spare area every time the second time interval occurs, the memory controller selects a physical unit with the highest erase count from all of the physical units belonging to the spare area for exchanging with the physical unit with the lowest erase count in the data area,
wherein the memory controller groups the physical units into at least a data area and a spare area, and records a first memory erase count when the physical unit exchange is performed between the data area and the spare area, wherein the first memory erase count is a memory erase count of the rewritable non-volatile memory module at the time of a specific physical unit belonging to the spare area is exchanged to the data area, the memory controller updates the memory erase count of the rewritable non-volatile memory module as the rewritable non-volatile memory module is in use, the memory controller obtains the memory erase count of the rewritable non-volatile memory module at the time of the specific physical unit is again associated to the spare area to serve as a second memory erase count, and compares a difference between the first memory erase count and the second memory erase count with a predetermined value, the memory controller determines that the rewritable non-volatile memory module does not contain the cold data when the difference is smaller than or equal to the predetermined value, and the memory controller determines that the rewritable non-volatile memory module contains the cold data when the difference is greater than the predetermined value.

15. The memory storage device as claimed in claim 14, wherein the memory controller records a write count of each of the logical units, obtains a plurality of used logical units with the corresponding write count greater than 0 from the logical units, and determines whether the rewritable non-volatile memory module contains the cold data according to a distribution characteristic of the write count of each of the used logical units.

16. The memory storage device as claimed in claim 15, wherein the memory controller determines that the rewritable non-volatile memory module does not contain the cold data when a difference between the write count of each two of the used logical units does not exceeds an error range, and the memory controller determines that the rewritable non-volatile memory module contains the cold data when at least one of the difference between the write count of each two of the used logical units exceeds the error range.

17. The memory storage device as claimed in claim 14, wherein the first time interval is greater than the second time interval.

18. The memory storage device as claimed in claim 17, wherein when the memory controller performs the physical unit exchange between the data area and the spare area every time the first time interval occurs, the memory controller randomly selects a physical unit or selects a physical unit with a higher erase count rather than the highest erase count from all of the physical units belonging to the spare area for exchanging with a physical unit with the lowest erase count in the data area.

* * * * *